(12) United States Patent
Wurster et al.

(10) Patent No.: US 12,174,948 B2
(45) Date of Patent: Dec. 24, 2024

(54) USING A VARIABLE WRITE PROFILE FOR DETECTING INTRUSION OF A COMPUTER PROGRAM

(71) Applicant: BlackBerry Limited, Waterloo (CA)

(72) Inventors: Glenn Daniel Wurster, Kitchener (CA); Benjamin Gnahm, Augsburg (DE); Paul Henri Michel Virally, Westmount (CA)

(73) Assignee: BlackBerry Limited, Waterloo (CA)

( * ) Notice: Subject to any disclaimer, the term of this patent is extended or adjusted under 35 U.S.C. 154(b) by 589 days.

(21) Appl. No.: 16/931,669

(22) Filed: Jul. 17, 2020

(65) Prior Publication Data
US 2022/0019656 A1  Jan. 20, 2022

(51) Int. Cl.
*G06F 21/55* (2013.01)
*G06F 21/52* (2013.01)
*G06F 21/56* (2013.01)
*G06F 21/57* (2013.01)
*G06F 21/79* (2013.01)

(52) U.S. Cl.
CPC ............ *G06F 21/554* (2013.01); *G06F 21/52* (2013.01); *G06F 21/566* (2013.01); *G06F 21/577* (2013.01); *G06F 21/79* (2013.01)

(58) Field of Classification Search
CPC ........ G06F 21/554; G06F 21/55; G06F 21/52; G06F 21/54; G06F 21/566; G06F 21/577; G06F 21/57
See application file for complete search history.

(56) References Cited

U.S. PATENT DOCUMENTS

| | | | |
|---|---|---|---|
| 9,330,260 B1 | 5/2016 | Guo | |
| 10,678,907 B2 * | 6/2020 | Aditham | G06F 21/552 |
| 10,810,310 B2 * | 10/2020 | Prvulovic | G06F 21/755 |
| 11,455,392 B2 * | 9/2022 | Basak | G06F 21/566 |

(Continued)

FOREIGN PATENT DOCUMENTS

WO    2018208715    11/2018

OTHER PUBLICATIONS

Extended European Search Report dated Nov. 26, 2021; Application No. 21179199.1.

(Continued)

*Primary Examiner* — Zachary A. Davis
(74) *Attorney, Agent, or Firm* — Rowand LLP (57) ABSTRACT

A computer-implemented method is disclosed. The method includes: identifying a set of program variables associated with a computer program; generating a profile of variable writes for the computer program based on tracking, for each variable in the set of program variables: a count of memory write operations for writing to the variable; and timestamps associated with the memory write operations; detecting a trigger condition associated with the set of program variables, the detecting including: monitoring a pattern of memory accesses by the computer program, the pattern of memory accesses indicating accesses of memory allocated to variables in the set of program variables; and detecting a deviation of the pattern of memory accesses from the profile of variable writes; and in response to detecting the trigger condition, generating a notification indicating an attack status on the computer program.

16 Claims, 6 Drawing Sheets

(56) References Cited

U.S. PATENT DOCUMENTS

| | | | | |
|---|---|---|---|---|
| 2003/0126590 A1* | 7/2003 | Burrows | ................ | G06F 8/437 |
| | | | | 712/E9.036 |
| 2009/0282393 A1* | 11/2009 | Costa | ..................... | G06F 21/54 |
| | | | | 717/134 |
| 2017/0285986 A1 | 10/2017 | Gopal | | |
| 2018/0232303 A1* | 8/2018 | Roeder | ............. | G11C 16/3418 |
| 2020/0257460 A1* | 8/2020 | Som | ..................... | G06F 3/0623 |

OTHER PUBLICATIONS

EPO Office Action dated Sep. 11, 2023; Application No. 21179199.1.

* cited by examiner

USING A VARIABLE WRITE PROFILE FOR DETECTING INTRUSION OF A COMPUTER PROGRAM

TECHNICAL FIELD

The present disclosure relates to computer security and, in particular, to systems and methods for detecting and/or preventing intrusions on programs executing on computing systems.

BACKGROUND

Computer program memory is generally categorized into two sections: "read-only" and "read/write". Static constants, strings, and other objects that do not change over the life of a computer program are stored in read-only memory. In contrast, read-write memory contains variables whose values can be altered at run-time.

Program variables may have different memory access patterns. Some variables may only be written to once, or infrequently. For example, certain non-local variables with static storage duration may only be written to during a program's start-up process, or during a system configuration change. Other variables may be altered frequently or on a regular basis during a program's execution.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, the present disclosure describes a computer-implemented method. The method includes: identifying a set of program variables associated with a computer program; generating a profile of variable writes for the computer program based on tracking, for each variable in the set of program variables: a number of memory write operations for writing to the variable; and timestamps associated with the memory write operations; detecting a trigger condition associated with the set of program variables, the detecting including: monitoring a pattern of memory accesses by the computer program, the pattern of memory accesses indicating accesses of memory allocated to variables in the set of program variables; and detecting a deviation of the pattern of memory accesses from the profile of variable writes; and in response to detecting the trigger condition, generating a notification indicating an attack status on the computer program.

In some implementations, detecting a deviation may include determining, for at least one variable in the set of program variables, that a number of memory write operations for the at least one variable in a given time period deviates from a frequency of write access for the at least one variable indicated in the profile of variable writes by more than a predefined threshold amount.

In some implementations, detecting a deviation may include determining, for at least one variable in the set of program variables, that a memory write operation for the at least one variable has occurred at a time that is different from an expected time of write access indicated in the profile of variable writes.

In some implementations, the tracking may include tracking information on write accesses by the computer program based on using shadow memory.

In some implementations, tracking information on memory accesses may include: determining, for at least one program variable, a number of writes to the variable; and instrumenting each assignment in the source code with a corresponding increment of the related shadow memory value.

In some implementations, the tracking may further include identifying, for each heap allocated program variable, the memory addresses within heap memory that are allocated to the variable.

In some implementations, the method may further include: identifying, based on the profile of variable writes, one or more program variables that are written to only during initialization of the computer program; and setting allocated memory for the identified program variables to read-only access.

In some implementations, the method may further include: identifying, based on the profile of variables writes, one or more program variables that are written to only during a configuration change associated with the computer program; and setting allocated memory for the identified program variables to read-only access.

In some implementations, the set of program variables may be stored in a secure enclave, and memory accesses for writing to the variables in the set of program variables may be checked against a memory access control policy.

In some implementations, a decision of whether to allow memory access for writing to a program variable is based on at least one of: a value that is being written to the program variable; or a source of instruction of the memory write operation.

In another aspect, the present disclosure describes a computing device. The computing device includes a memory and a processor coupled to the memory. The processor is configured to: identify a set of program variables associated with a computer program; generate a profile of variable writes for the computer program based on tracking, for each variable in the set of program variables: a count of memory write operations writing to the variable; and timestamps associated with the memory write operations; detect a trigger condition associated with the set of program variables, the detecting including: monitoring a pattern of memory accesses by the computer program, the pattern of memory accesses indicating accesses of memory allocated to variables in the set of program variables; and detecting a deviation of the pattern of memory accesses from the profile of variable writes; and in response to detecting the trigger condition, generate a notification indicating an attack status on the computer program.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any sub-combination, or all of the elements, without necessarily excluding any additional elements, and without necessarily requiring all of the elements.

Computer programs generally include variables of different scope (e.g. global variables, local variables) and lifetime (e.g. static variables, automatic variables, objects). Memory for data variables may be allocated at compile time (i.e. static memory allocation), or it may be allocated for data variables after the program begins execution (i.e. dynamic memory allocation). Memory that is allocated to variables can be classified into two categories of access permissions. The first is "read-only" memory, which refers to memory containing constants, string, and other objects that do not change over the life of a computer program. The second category is "read-write" memory. All variables that might change over the life of the program (even if such change is rare) are stored in read-write memory.

Different variables have different patterns of memory access. That is, when a computer program is executed, the program variables of the computer program may be accessed according to their respective patterns of memory access for read and/or write operations. Some variables may only be written to once or infrequently, while other variables may be written to on a regular basis during the life of a computer program. The classification of variables as "read-only" or "read-write" may thus be overly broad, and may not adequately describe the range of different memory access patterns of program variables.

Useful insight can be acquired by analyzing program variables of computer software. Program analysis may be dynamic or static. Dynamic program analysis refers to analysis of software that is performed by executing a program on a real or virtual processor. Dynamic program analysis techniques may be employed in, for example, runtime memory analysis and error detection, fault localization, performance data capture and analysis, and detecting security problems. Static program analysis, on the other hand, is analysis of software that is performed without actually executing programs. The analysis is typically performed on some version of the source code and/or the object code. Static program analysis techniques are useful for compiler optimization, error detection in code, and prevention of system and software intrusions.

The present application proposes a solution for detecting computer system vulnerabilities based on program analysis of the variables of computer programs. According to embodiments of the present disclosure, a computer system builds a profile of variable writes for the variables of a computer program. The pattern of write operations for the program variables are stored in the profile. The profile may indicate, for example, a number of write operations and times (e.g. timestamps) associated with the write operations on a per-variable basis for the program variables. Once the profile of variable writes is generated, the profile can be used for intrusion detection and/or intrusion prevention. The profile may, for example, be used to model "normal" operating behavior for the computer program. In particular, the write patterns of variables can be taken as representative of normal, or expected, operating behavior. Upon detecting divergence from the modeled normal operating behavior, it may be determined that a potential intrusion or attack on the computer program exists.

Additionally, or alternatively, the profile of variable writes may be used to inform which program variables may be afforded memory access protections without significantly impacting the performance of the computer program. If certain variables are written to infrequently, these variables may be given additional memory protections so that their data is less prone to attack. Variables may be automatically assigned additional protections based on, for example, frequency and timing of writes to the variables. In some embodiments, the access permission (or property) of such protected variables may be changed from read-write to read-only. For example, variables that are determined, based on the profile of variable writes, to be written to only during initialization of a computer program may be moved to separate memory marked as read-only after the program has initialized. As another example, variables that are written to only during a configuration change for a computer program may be given additional memory protections by changing their property to read-only (unless an owner of the computer system indicates that the system is being reconfigured).

Figure 1A:
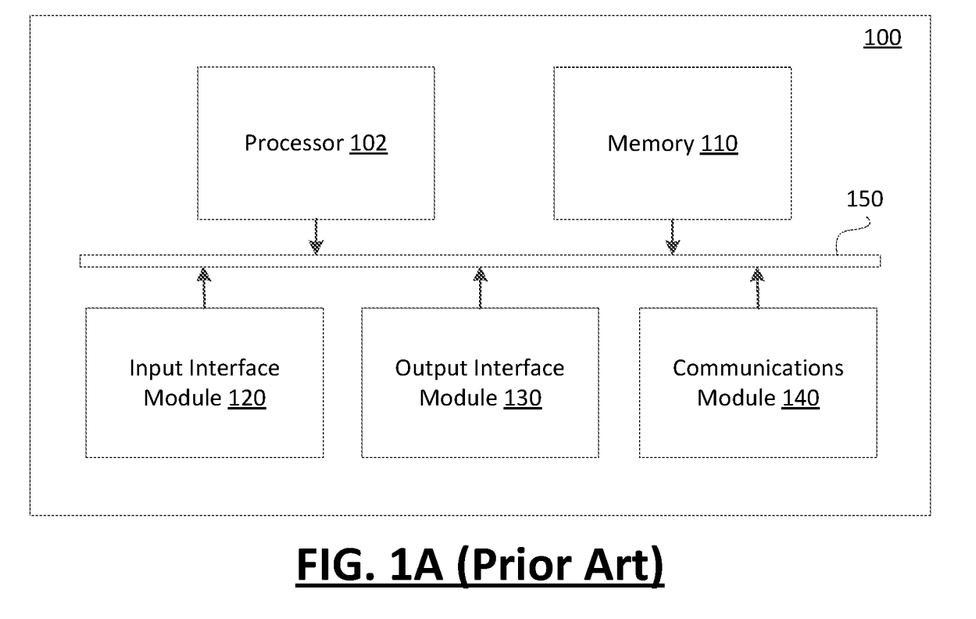
FIG. 1A is a high-level operation diagram of an example computing device for implementing example embodiments of a computer security system.

Reference is first made to FIG. 1A, which is a high-level operation diagram of an example computing system 100. The computing system 100 may be configured to implement processes for detecting and/or preventing system intrusions in accordance with embodiments described herein. The computing system 100 includes a plurality of modules. For example, the computing system 100 may include a processor 102, a memory 110, an input interface module 120, an output interface module 130, and a communications module 140. As illustrated, the foregoing example modules of the computing system 100 are in communication over a bus 150.

The processor 102 is a hardware processor. Processor 102 may, for example, be one or more ARM, Intel x86, PowerPC processors or the like.

The memory 110 allows data to be stored and retrieved. The memory 110 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the computing system 100.

The input interface module 120 allows the computing system 100 to receive input signals. Input signals may, for example, correspond to input received from a user. The input interface module 120 may serve to interconnect the computing system 100 with one or more input devices. The output interface module 130 allows the computing system 100 to provide output signals. Some output signals may, for example allow provision of output to a user. The output interface module 130 may serve to interconnect the computing system 100 with one or more output devices. Output signals may be sent to output devices by output interface module 130.

The communications module 140 allows the computing system 100 to communicate with other devices and/or various communications networks. For example, the communications module 140 may allow the computing system 100 to send or receive communications signals. Communications signals may be sent or received according to one or more protocols or standards. For example, the communications module 140 may allow the computing system 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 140 may allow the computing system 100 to communicate using near-field communication (NFC), via Wi-Fi™, using Bluetooth™ or via some combination of one or more networks or protocols.

Software comprising instructions is executed by the processor 102 from a computer-readable medium. For example, software may be loaded into random-access memory from persistent storage of memory 110. Additionally, or alternatively, instructions may be executed by the processor 102 directly from read-only memory of memory 110.

Figure 1B:
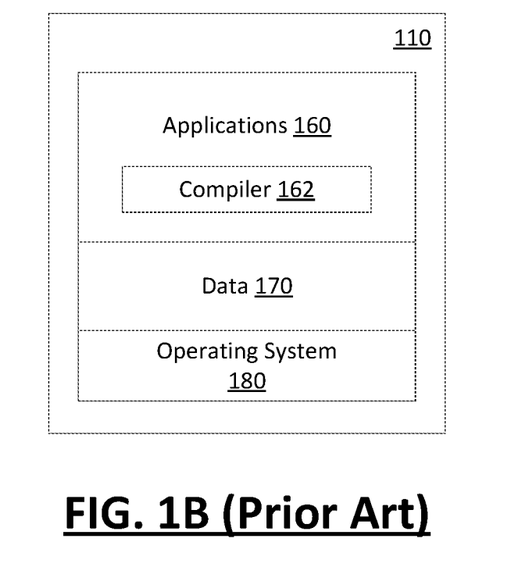
FIG. 1B depicts a simplified software organization of the example computing device of FIG. 1A.

FIG. 1B depicts a simplified organization of the components of an exemplary memory 110 of the computing system 100. As illustrated, the memory 110 may include applications 160, data 170, and an operating system 180.

The applications 160 may comprise high-level software instructions to be processed by an interpreter or compiler to configure the processor 102 of computing system 100. The applications 160 include, at least, a compiler 162 that translates computer code written in a programming language into a target language. More particularly, the compiler 162 translates source code from a high-level programming language to a lower level language, such as assembly, object code, or machine code, to create an executable program. The compiler 162 may be configured to perform various operations including, but not limited to, preprocessing, lexical analysis, parsing, conversion of input programs to an intermediate representation, code optimization, and code generation. The applications 160 may additionally, or alternatively, include an interpreter (not illustrated) which is a computer program that directly executes instructions written in a programming language, without requiring the instructions to have been compiled into a machine language program.

The data 170 includes, at least, application data for the applications 160. For each application 160 in memory 110, the data 170 may include program configuration data, cache data, application state data, constant data, user data, and debugging data. Such application data may be organized by program variables that are maintained by the applications 160. Program variables may store simple data, such as integers and literal strings, as well as values of other datatypes.

The operating system 180 is software. The operating system 180 may, for example, be Apple iOS™, Google™ Android™, Linux™, Microsoft™ Windows™, or the like.

Figure 2:
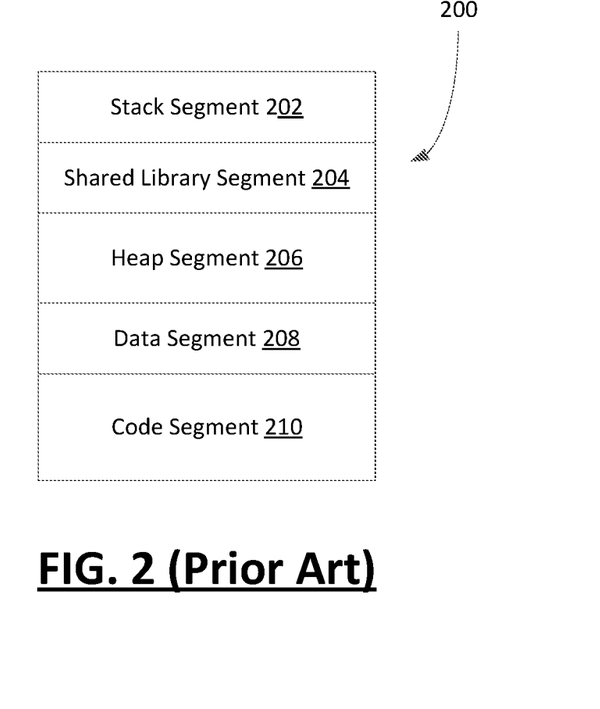
FIG. 2 illustrates a segmented memory address space.

Reference is made to FIG. 2, which illustrates an example process address space 200. A process of a computer program usually has, in its address space, blocks of memory comprising machine code and data. As shown in FIG. 2, a process address space 200 may be a combination of a (run-time) stack segment 202, a shared library segment 204, a heap segment 206, a data segment 208, and a code segment 210.

The active functions or subroutines of a computer program use the stack segment 202 for storage and manipulation of local variables and parameters. The run-time stack is used for keeping track of the point to which the active subroutines should return control when they finish executing. A program may rely on several libraries, which are loaded into memory. For each library that is loaded, a data segment and code segment will be allocated. The heap segment 206 contains dynamically allocated variables used by computer programs. A computer's memory manager can allocate, coalesce, and free up memory contained in the heap segment 206 of the process address space 200. Garbage collection functionality of the memory manager allows portions of the heap segment memory to be reclaimed. The data segment 208 stores initialized global and static variables. The data segment 208 will contain both read-only and read/write regions on most architectures, and the values of variables in the read/write regions of the data segment 208 can be modified at run-time. The code segment 210 contains executable instructions of the computer program. The code segment 210 is typically read-only and the size is fixed at process start.

Different computer programs use different regions of the segments of memory described above in different ways. Accordingly, the pattern of accesses of the memory segments may vary among different computer programs.

Figure 3:
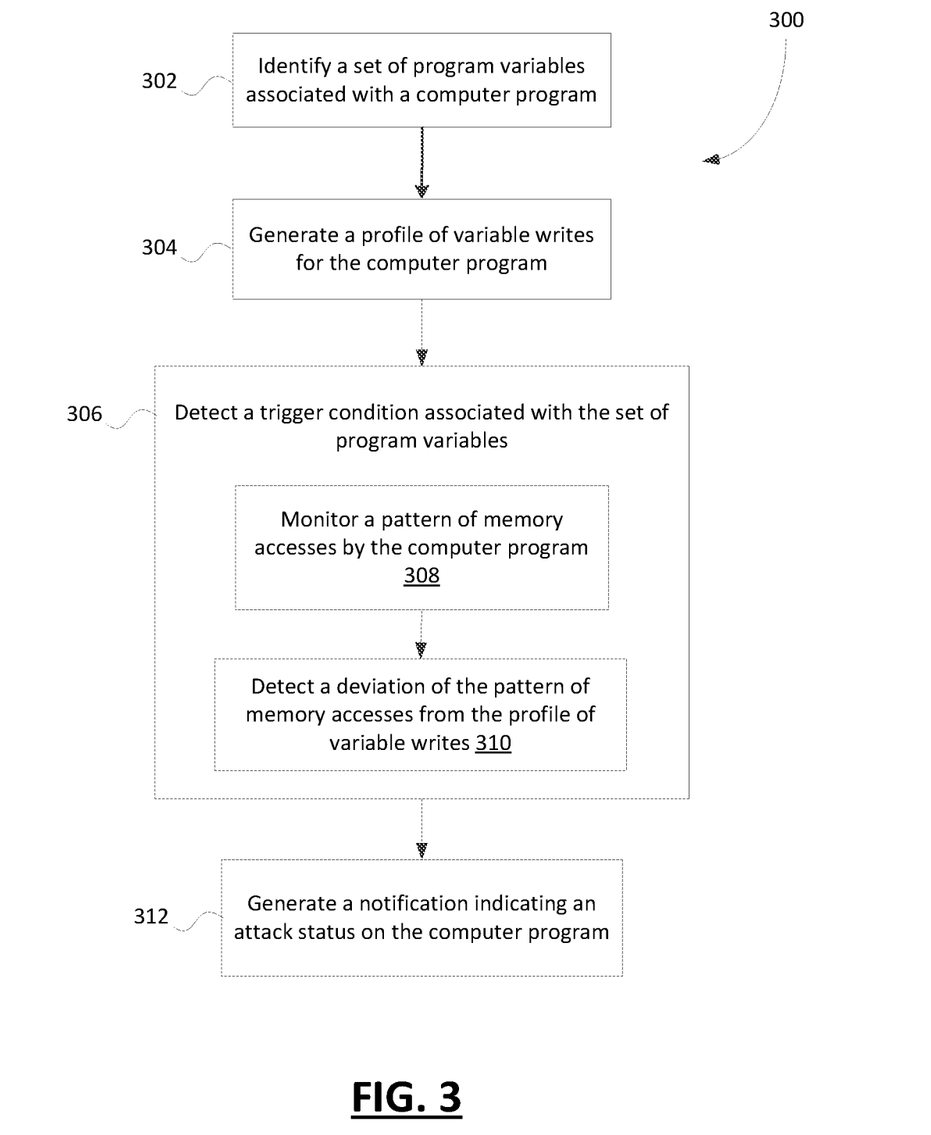
FIG. 3 shows, in flowchart form, an example method for identifying computer security vulnerabilities based on program analysis.

Reference is now made to FIG. 3, which shows, in flowchart form, an example method 300 for identifying computer security exploits based on program analysis. More particularly, the method 300 may be implemented in detecting and/or preventing security exploits that may be associated with an executing computer program. Operations starting with operation 302 and continuing onward are performed by a processor, such as processor 102, of a computing system executing software comprising instructions such as may be stored in a memory of the computing system. For example, the processor may perform some or all of the operations of method 300 when executing instructions associated with a compiler, compiler plugin, compiler generated code, interpreter, or a supplementary software component.

In operation 302, the processor executing software comprising instructions identifies a set of program variables associated with a computer program. In particular, the processor obtains lists of all defined program variables, including global and local variables. The processor can retrieve the program variables data from the memory (e.g. data segment of memory) associated with the computing system.

In operation 304, the processor generates a profile of variable writes for the computer program. More specifically, the profile may be generated based on tracking, for each variable in the set of program variables, a count of memory write operations for writing to the variable and timestamps associated with the memory write operations. In at least some embodiments, the processor and/or software may use shadow memory to store information about the program variables. In particular, the processor and/or software may use shadow memory to count the number of writes to each variable. For example, the compiler may instrument each assignment in the source code with a corresponding increment of a related shadow memory value.

For each of the program variables, the profile may indicate (or provide information for deriving) timing of write operations, frequency of write operations, type of data written, function or subroutine that writes data to the variable, and associated level of protection (e.g. read-only, read-write). In at least some embodiments, the processor may monitor various functions/subroutines of the computer program and the write access operations associated with said functions/subroutines. In particular, during execution of the computer program, the processor may track function calls and the variable write operations corresponding to the function calls. The processor may, for example, generate a mapping between functions and variable write operations, which can be used to determine a timeline of when variables are written to (or expected to be written to) within the computer program. Such timeline is reflected in the profile of variable writes generated for the computer program.

In some embodiments, the tracking of program variable data may include identifying, for each heap allocation, where the allocation was performed. This information may be stored, for example, in metadata associated with the profile of variables writes. This metadata may allow for more fine-grained profiling for heap allocated memory.

In at least some embodiments, the profile of variable writes may be generated based on tracking of program variable data for a computer program during a predetermined period of time. For example, program variable data may be tracked only for a defined period of time beginning at startup of the computer program, and the profile of variable writes may be generated based on the data collected during the defined period. The period of time for tracking the program variable data may depend on a number of factors, such as length of program code for the computer program, number of program variables, number of function calls, program type of the computer program, etc. In particular, the processor may determine a period of time (or a number of times of program execution) that would be suitable for developing a comprehensive and accurate profile of write access patterns for the program variables of the computer program. The program variables may then be tracked only for the duration of such period of time.

In some other embodiments, the profile of variables writes may be generated and continuously updated based on write access patterns of the program variables. In particular, the profile of variable writes may be updated after write access operations that are determined to be normal or expected operating behavior for the computer program. That is, the profile may be dynamically updated on an ongoing basis.

In operation 306, the processor detects a trigger condition associated with the set of program variables for the computer program. A trigger condition may represent an indication that there may be a potential attack or intrusion on the computer program. Once the profile of variable writes has been built up, the profile can be used in detecting trigger conditions associated with the computer program. The processor and/or software monitors the pattern of memory accesses by the computer program, in operation 308, on variables identified in operation 302.

When monitoring the pattern of memory accesses, the processor may detect a deviation of the pattern of memory accesses from the profile of variable writes, in operation 310. A deviation may signal that the computer program is behaving abnormally. For example, a deviation may be detected as a result of exploitation of a program vulnerability, such as a code injection attack. Code injection refers to exploitation of a bug by an attacker to compromise a computer program. Specifically, injection may be used to introduce code into a computer program and change the course of execution of the computer program. By monitoring patterns of memory writes, the processor may detect attempts to exploit vulnerabilities associated with the computer program.

Various different types of deviations may be detected by the processor. In some embodiments, the processor may determine, for at least one variable in the set of program variables, that a count of memory write operations for the at least one variable in a given time period deviates from a frequency of write access for the at least one variable indicated in the profile of variable writes. The profile may indicate a frequency of write access for a selected variable. For example, the processor may determine, based on the pattern of memory access for the variable indicated in the profile, an average duration between write access to the variable. If the processor determines that the number of memory write operations in a given time period deviates from a corresponding frequency of write access derived from the profile by more than a predefined threshold amount, a deviation of the pattern of memory access may be detected.

In some embodiments, the processor may determine, for at least one variable in the set of program variables, that a memory write operation for the at least one variable has occurred at a time that is different from an expected time of write access. The expected time of write access may be derived from the profile of variables writes. If a particular memory write operation for a selected variable occurs at an unexpected time, a deviation of the pattern of memory access may be detected.

In response to detecting the trigger condition, the processor generates a notification indicating an attack status on the computer program, in operation 312. The notification may indicate simply that a vulnerability exploit may have occurred (or is occurring). For example, the notification may indicate a divergence from expected program behavior, and that a particular vulnerability of the computer program may be exploited (or is currently being exploited). Additionally, or alternatively, the notification may indicate the type of deviation that was detected in the pattern of memory access for a selected variable. For example, the notification may include information identifying the variable written to, observed variable write behavior, expected variable write behavior according to the profile, and possible reasons for the detected divergence of the pattern of memory access from the profile. The generated notification may be outputted to a computing device. For example, the notification may be transmitted to a display device associated with the computing system for display thereon.

Figure 4:
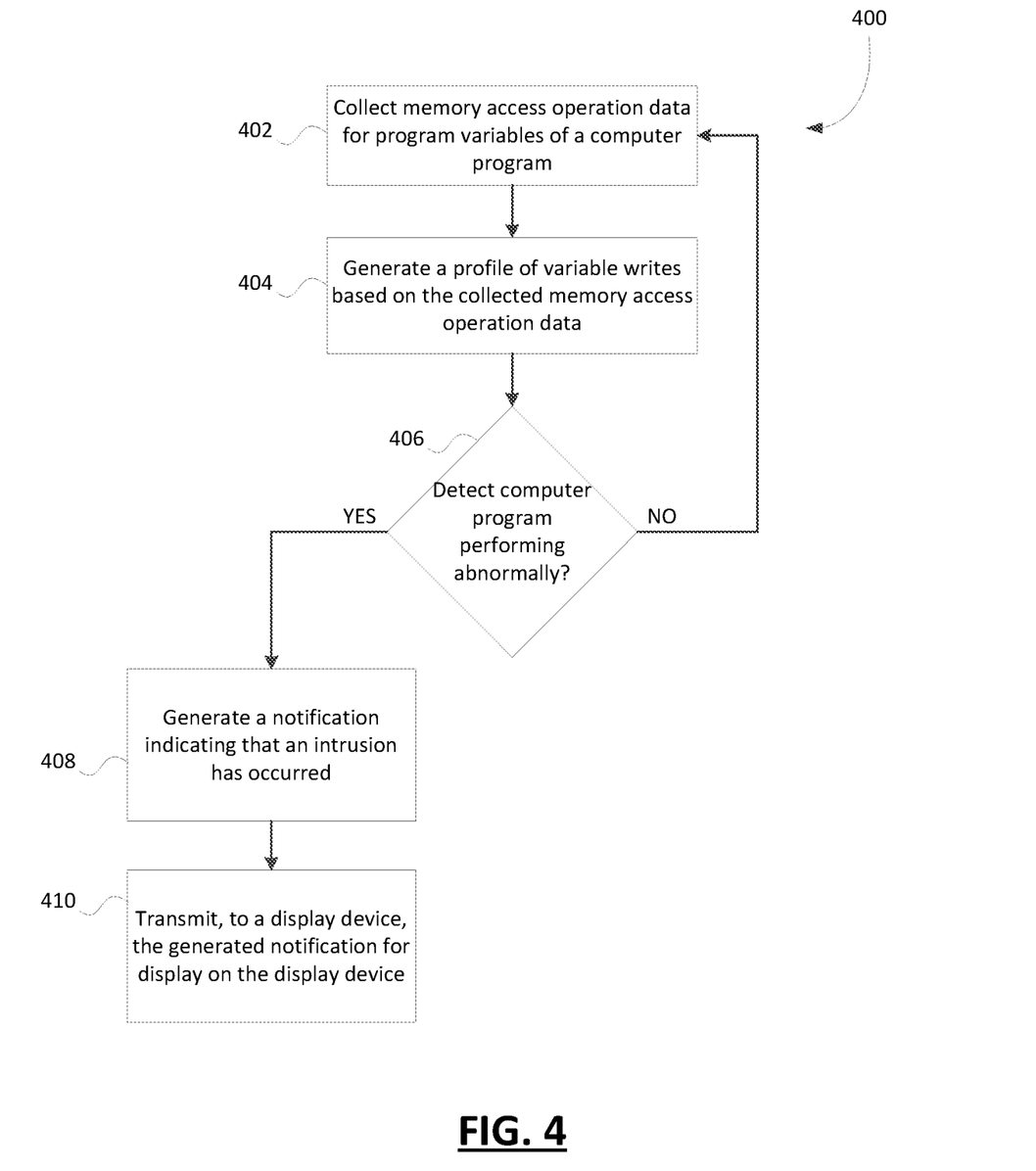
FIG. 4 shows, in flowchart form, another example method for identifying computer security vulnerabilities based on program analysis.

Reference is now made to FIG. 4, which shows, in flowchart form, an example method 400 for identifying computer security vulnerabilities based on program analysis. The method 400 may be implemented in detecting and/or preventing security attacks that may be associated with an executing computer program. Operations starting with operation 402 and continuing onward are performed by a processor, such as processor 102, of a computing system executing software comprising instructions such as may be stored in a memory of the computing system. The operations of method 400 may be performed in addition to, or as alternatives of, one or more operations of method 300.

In operation 402, the processor and/or software collects memory access operation data for program variables of the computer program. In particular, the processor and/or software monitors the computer program's memory access operations for writing to the program variables. In operation 404, the processor generates a profile of variable writes based on the collected memory access operation data. This operation may be performed in a similar manner as operation 304 of method 300.

The processor and/or software determines whether the computer program is performing abnormally, in operation 406. The variable write data for the computer program that is indicated in the profile of variable writes may be taken as "normal" operating behavior of the computer program, and the processor may determine that the computer program is performing abnormally if deviations of the computer program's current memory access operations from the variable write data in the profile are detected. For example, a computer program that suddenly starts to frequently re-read its configuration file/data and update the related variables in memory may be determined to be performing abnormally.

If the computer program is determined to be performing abnormally, the processor and/or software may generate a notification indicating that an intrusion has occurred, in operation 408. In operation 410, the generated notification may be transmitted for display on a display device associated with the computing system.

Figure 5:
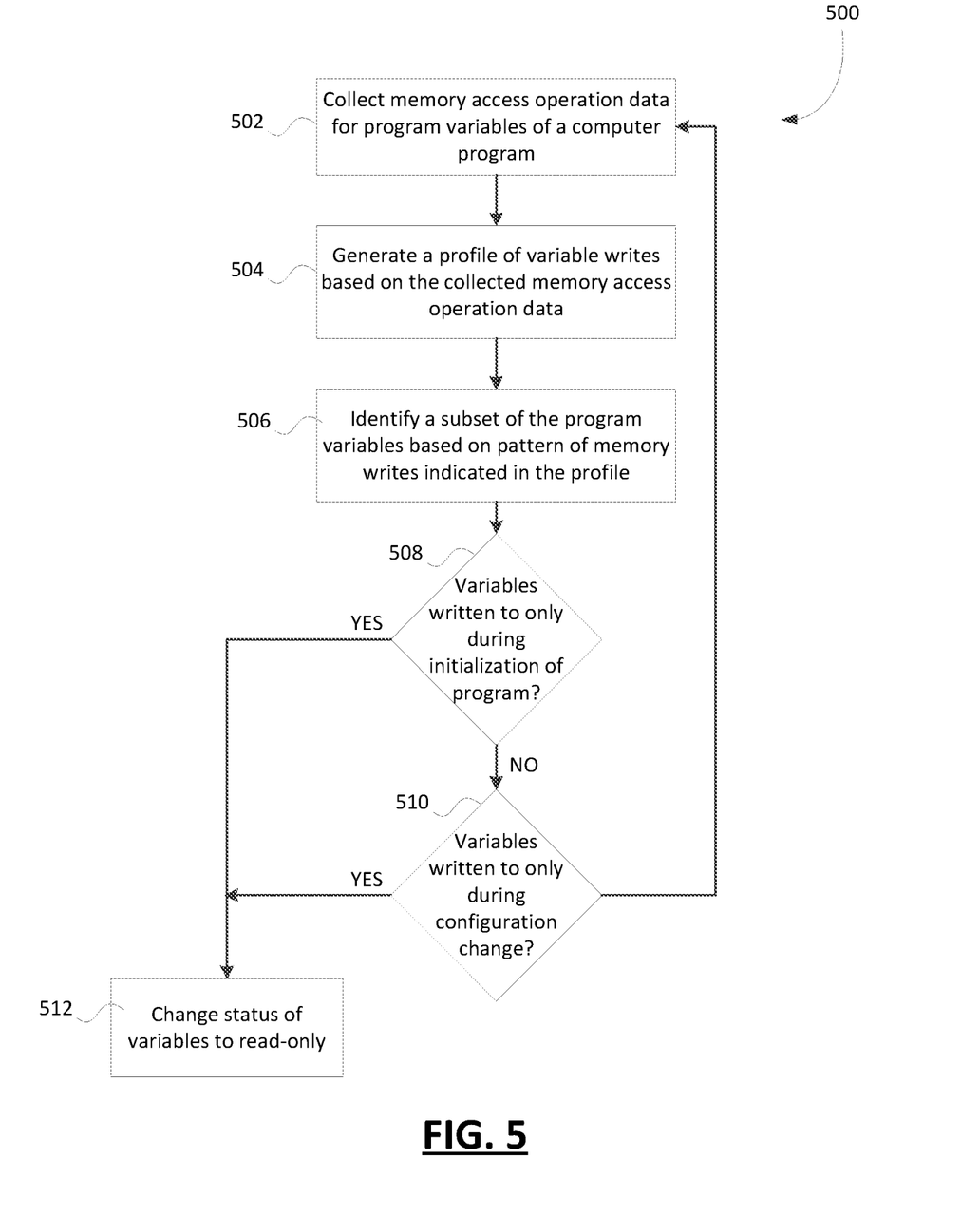
FIG. 5 shows, in flowchart form, another example method for identifying computer security vulnerabilities based on program analysis.

Reference is now made to FIG. 5, which shows, in flowchart form, an example method 500 for mitigating computer security attacks based on program analysis. The method 500 may be implemented in detecting and/or preventing security attacks that may be associated with an executing computer program. Operations starting with operation 502 and continuing onward are performed by a processor, such as processor 102, of a computing system executing software comprising instructions such as may be stored in a memory of the computing system. The operations of method 500 may be performed in addition to, or as alternatives of, one or more operations of methods 300 and 400.

In operation 502, the processor and/or software collects memory access operation data for program variables of the computer program. Based on the collected memory access operation data, the processor and/or software generates a profile of variable writes, in operation 504. The operations 502 and 504 correspond to, and are performed in a similar manner as, operations 402 and 404 of method 400.

In operation 506, the processor identifies a subset of the program variables based on pattern of memory writes indicated in the profile. Upon analyzing the profile of variable writes, it may become apparent that certain variables (i.e. subset of the program variables) are written to infrequently or at specific points in time. Such variables may be accorded increased security and protection by limiting memory access to the variables. Variables that are not included in the subset may remain in read-write mode.

In some embodiments, the subset of program variables may be identified based on timing of write operations. In particular, the processor may, in operation 508, identify, based on the profile of variable writes, one or more program variables that are written to only during initialization of the computer program. For these identified variables, the processor may set the allocated memory to read-only access, in operation 512. Otherwise, the processor determines whether the variables are written to only during a configuration change for the computer program, in operation 510. That is, the processor may identify those variables that are written to when the program configuration is updated. The processor may set the allocated memory for these variables to read-only access.

In some cases, an authorized entity (e.g. owner, managing entity) associated with the computing system may manually indicate that a particular variable is being written. For example, an owner of the computing system may indicate that the system is being reconfigured. That is, the owner may manually signal that one or more variables are being accessed. Such memory access operations may not be identified as abnormal operating behavior or as deviations from the variable write data in the profile. The processor may be prevented from changing memory access modes of variables when such manual override actions are taken by an authorized entity.

Figure 6:
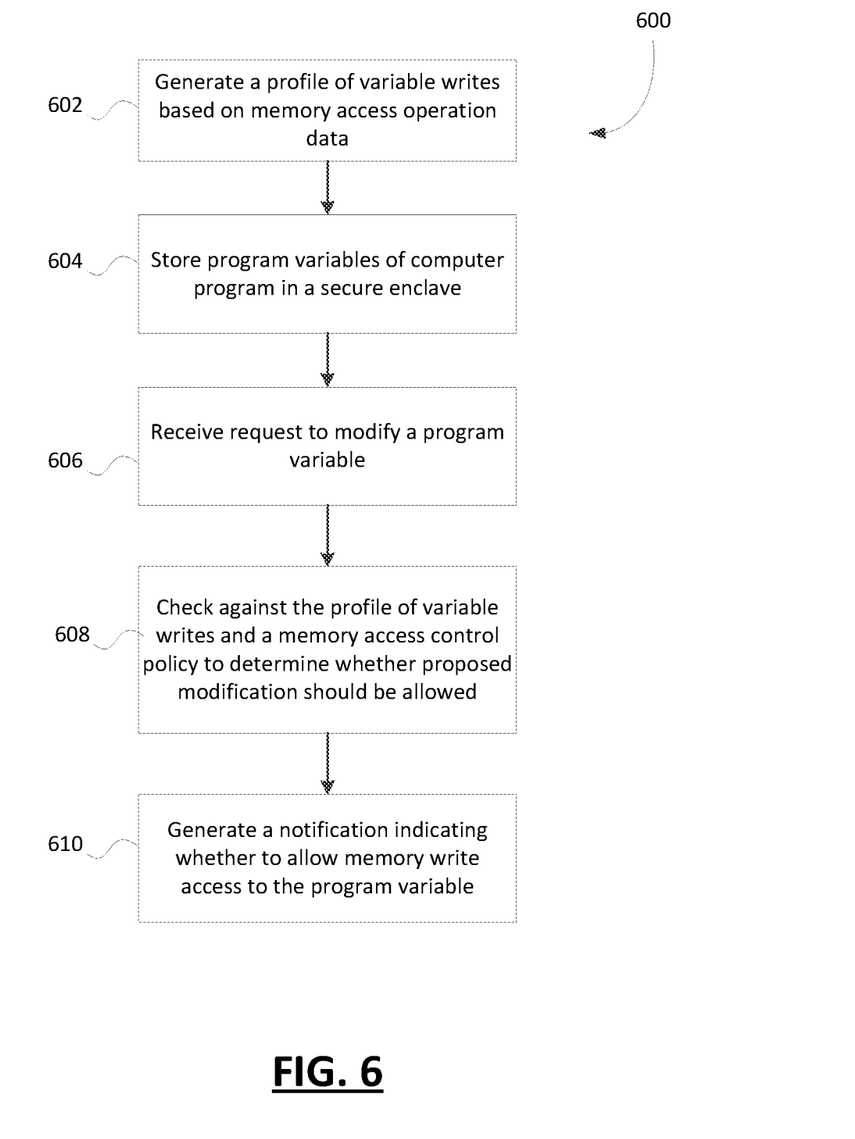
FIG. 6 shows, in flowchart form, another example method for identifying computer security vulnerabilities based on program analysis.

Reference is now made to FIG. 6, which shows, in flowchart form, an example method 600 for identifying computer security attacks based on program analysis. The method 600 may be implemented in detecting and/or preventing security attacks that may be associated with an executing computer program. Operations starting with operation 602 and continuing onward are performed by a processor, such as processor 102, of a computing system executing software comprising instructions such as may be stored in a memory of the computing system. The operations of method 600 may be performed in addition to, or as alternatives of, one or more operations of methods 300, 400 and 500.

In operation 602, the processor generates a profile of variable writes based on memory access operation data. This operation may be performed in a similar manner as operation 404 of method 400. In operation 606, the processor receives a request to modify a program variable of the computer program. The request may be received, for example, from a function or subroutine of the computer program. Upon receiving the request, the processor performs a check against the profile of variable writes and a memory access control policy to determine whether the proposed modification should be allowed, in operation 608.

In operation 604, the processor and/or software stores program variables of a computer program in a secure enclave. The secure enclave may be a defined memory location that is isolated from other program data (e.g. shared memory), in order to provide an extra layer of security. In particular, the secure enclave is an isolated region of memory that is protected from use by external processes.

In some embodiments, the decision of whether to allow memory access for writing to a program variable may be based on various factors. For example, the decision may depend on the value that is being written to the program variable. The memory may store, for example, a whitelist of allowed values for selected variables, and the processor may determine whether a variable write should be permitted based on the allowed values. As another example, the decision may depend on the source of instruction of the memory write operation (e.g. call stack, instruction pointer, etc.).

In operation 610, the processor may generate a notification indicating whether to allow memory write access to the program variable. If the memory write access is not allowed, the notification may indicate that access is denied and/or that a potential attack or intrusion on the computer program has been detected.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer-implemented method, comprising:
identifying, by a processor of a computing device, a set of program variables associated with a computer program executing on the computing device;
generating, by the processor, a profile of variable writes for the computer program based on:
tracking, by the processor, during execution of the computer program, function calls and variable write operations corresponding to the function calls; and
determining, by the processor, for each respective variable in the set of program variables:
a count of memory write operations for writing to the respective variable, wherein determining the count includes instrumenting, by a compiler, each assignment in source code of the computer program with a corresponding increment of a related shadow memory value; and
timestamps associated with the memory write operations for writing to the respective variable;
detecting, by the processor, a trigger condition associated with the set of program variables, the detecting including:
monitoring, by the processor, a pattern of memory accesses by the computer program, the pattern of memory accesses indicating accesses, by the computer program, of memory allocated to first variables in the set of program variables, wherein the accesses of memory are for writing to the first variables; and
detecting, by the processor, a deviation of the pattern of memory accesses from the profile of variable writes; and
in response to detecting the trigger condition, generating, by the processor, a notification indicating an attack status on the computer program.

2. The method of claim 1, wherein detecting a deviation comprises determining by the processor, for at least one variable in the set of program variables, that a count of memory write operations for writing to the at least one variable in a given time period deviates from a frequency of write access for the at least one variable indicated in the profile of variable writes by more than a predefined threshold amount.

3. The method of claim 1, wherein detecting a deviation comprises determining by the processor, for at least one variable in the set of program variables, that a memory write operation for writing to the at least one variable has occurred at a time that is different from an expected time of write access indicated in the profile of variable writes.

4. The method of claim 1, wherein the tracking further comprises identifying by the processor, for each of one or more heap allocated program variables, a memory address within heap memory that is allocated to the respective heap allocated program variable.

5. The method of claim 1, further comprising:
identifying by the processor, based on the profile of variable writes, one or more program variables that are written to only during initialization of the computer program; and
setting, by the processor, allocated memory for the identified program variables to read-only access.

6. The method of claim 1, further comprising:
identifying by the processor, based on the profile of variable writes, one or more program variables that are written to only during a configuration change associated with the computer program; and
setting, by the processor, allocated memory for the identified program variables to read-only access.

7. The method of claim 1, wherein the set of program variables is stored in a secure enclave, and wherein memory accesses for writing to the variables in the set of program variables are checked against a memory access control policy.

8. The method of claim 7, wherein a decision of whether to allow memory access for writing to a first program variable is based on at least one of:
a value that is being written to the first program variable; or
a source of instruction of a memory write operation for writing to the first program variable.

9. A computing device, comprising:
a processor; and
a memory coupled to the processor, the memory storing processor-executable instructions that, when executed by the processor, configure the processor to:
identify a set of program variables associated with a computer program executing on the computing device;
generate a profile of variable writes for the computer program based on:
tracking, during execution of the computer program, function calls and variable write operations corresponding to the function calls; and
determining, for each respective variable in the set of program variables:
a count of memory write operations for writing to the respective variable, wherein determining the count includes instrumenting, by a compiler, each assignment in source code of the computer program with a corresponding increment of a related shadow memory value; and
timestamps associated with the memory write operations for writing to the respective variable;
detect a trigger condition associated with the set of program variables, the detecting including:
monitoring a pattern of memory accesses by the computer program, the pattern of memory accesses indicating accesses, by the computer program, of memory allocated to first variables in the set of program variables, wherein the accesses of memory are for writing to the first variables; and
detecting a deviation of the pattern of memory accesses from the profile of variable writes; and in response to detecting the trigger condition, generate a notification indicating an attack status on the computer program.

10. The computing device of claim 9, wherein detecting a deviation comprises determining, for at least one variable in the set of program variables, that a count of memory write operations for writing to the at least one variable in a given time period deviates from a frequency of write access for the at least one variable indicated in the profile of variable writes by more than a predefined threshold amount.

11. The computing device of claim 9, wherein detecting a deviation comprises determining, for at least one variable in the set of program variables, that a memory write operation for writing to the at least one variable has occurred at a time that is different from an expected time of write access indicated in the profile of variable writes.

12. The computing device of claim 9, wherein the tracking further comprises identifying, for each of one or more heap allocated program variables, a memory address within heap memory that is allocated to the respective heap allocated program variable.

13. The computing device of claim 9, wherein the processor is further configured to:
 identify, based on the profile of variable writes, one or more program variables that are written to only during initialization of the computer program; and
 set allocated memory for the identified program variables to read-only access.

14. The computing device of claim 9, wherein the processor is further configured to:
 identify, based on the profile of variable writes, one or more program variables that are written to only during a configuration change associated with the computer program; and
 set allocated memory for the identified program variables to read-only access.

15. The computing device of claim 9, wherein the set of program variables is stored in a secure enclave, and wherein memory accesses for writing to the variables in the set of program variables are checked against a memory access control policy.

16. The computing device of claim 15, wherein a decision of whether to allow memory access for writing to a first program variable is based on at least one of:
 a value that is being written to the first program variable; or
 a source of instruction of a memory write operation for writing to the first program variable.

* * * * *